E. M. Coombs,
Egg-Box.
Nº 50,341. Patented Oct. 10, 1865.
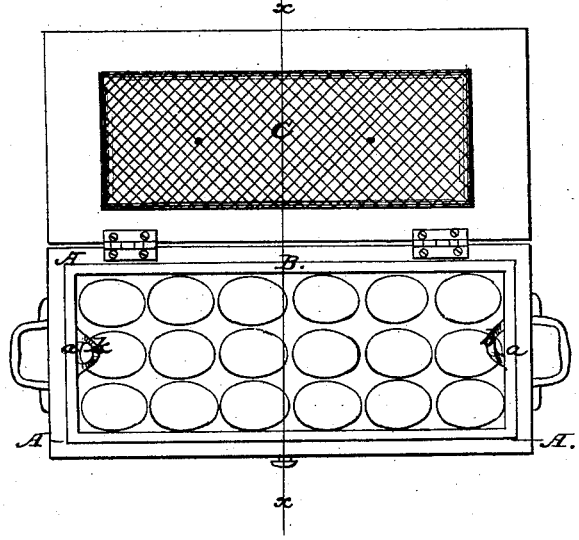
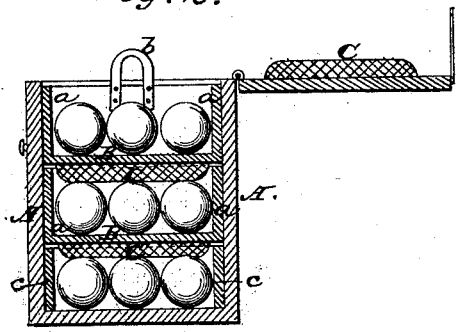
Witnesses:
Theo Tusch
Wm Trewrn
Inventor.
E. M. Coombs
By Munn & Co
Attys

UNITED STATES PATENT OFFICE.

EDEN M. COOMBES, OF MEMPHIS, INDIANA.

BOX FOR PACKING EGGS.

Specification forming part of Letters Patent No. 50,341, dated October 10, 1865.

*To all whom it may concern:*

Be it known that I, EDEN M. COOMBES, of Memphis, in the county of Clark and State of Indiana, have invented a new and Improved Packing-Box for Eggs; and I do hereby declare that the following is a full, clear, and exact description thereof, which will enable those skilled in the art to make and use the same, reference being had to the accompanying drawings, forming part of this specification, in which—

Figure 1 is a plan or top view of my packing-box for eggs. Fig. 2 is a cross-section of the same, taken in the line $x\ x$, Fig. 1.

In transporting eggs the breakage of the same is almost always caused by the weight of the layers of eggs one upon another. The object, therefore, of my invention is to provide a packing-box whose internal arrangement shall be such as to separate the several layers so that each layer shall be independent of the next; and my invention consists in arranging within a suitable box a series of cases, one above the other and of a depth sufficient to receive a layer of eggs, as will be hereinafter described.

To enable others to understand my invention, I will proceed to describe it.

A represents a box or chest, which may be of any desirable shape or size, and which I propose to use for a packing-box for eggs.

B B represent a series of cases or shelves having sides $a\ a$ all around, of a height or depth somewhat more than the thickness crosswise of an ordinary hen's egg. The size of these cases is such as to admit of their ready insertion into the box and withdrawal therefrom, each case being provided with handles or straps $b\ b$, by which to lift it. When the cases thus made are placed in the chest or box A the bottom of the one case rests upon the tops of the sides of the one next below. In the present instance, to economize somewhat in room, I have nailed cleats $e$ around the sides of the box, at the proper distance from the bottom thereof, to provide a place for the lowest or bottom layer of eggs, and the case above it rests upon these. On the under side of each case, as well as on the lid, I secure a cushion or pad, C, made of any soft substance, of a size to permit it to rest upon the eggs in the case below just hard enough to keep them from jostling. These pads are of great service. They keep the eggs steady; and if this is accomplished there is but little liability of their being broken.

To provide for any lateral rubbing of the eggs one against the other, saw-dust or meal, or any substance usually employed in packing eggs, may be scattered in between them after they have been placed in their cases.

I do not confine myself to any particular manner of making the cases. It is obvious that cleats could be nailed around the inside of the box, at suitable distances apart, and shelves placed upon them with the pads on the bottom, and this would accomplish the same thing.

What I claim as my invention, and desire to secure by Letters Patent, is—

The use of pads or cushions C, applied to the bottom of the cases or shelves, for the purpose herein specified.

The above specification of my invention signed by me this 10th day of June, 1865.

EDEN M. COOMBES.

Witnesses:
 MADISON COMBS,
 WILLIAM P. MCLELLEN.